Dec. 4, 1928.  
J. H. SETHER  
1,693,673  
WAGON TRACTOR HITCH  
Filed Dec. 17, 1927   2 Sheets-Sheet 1
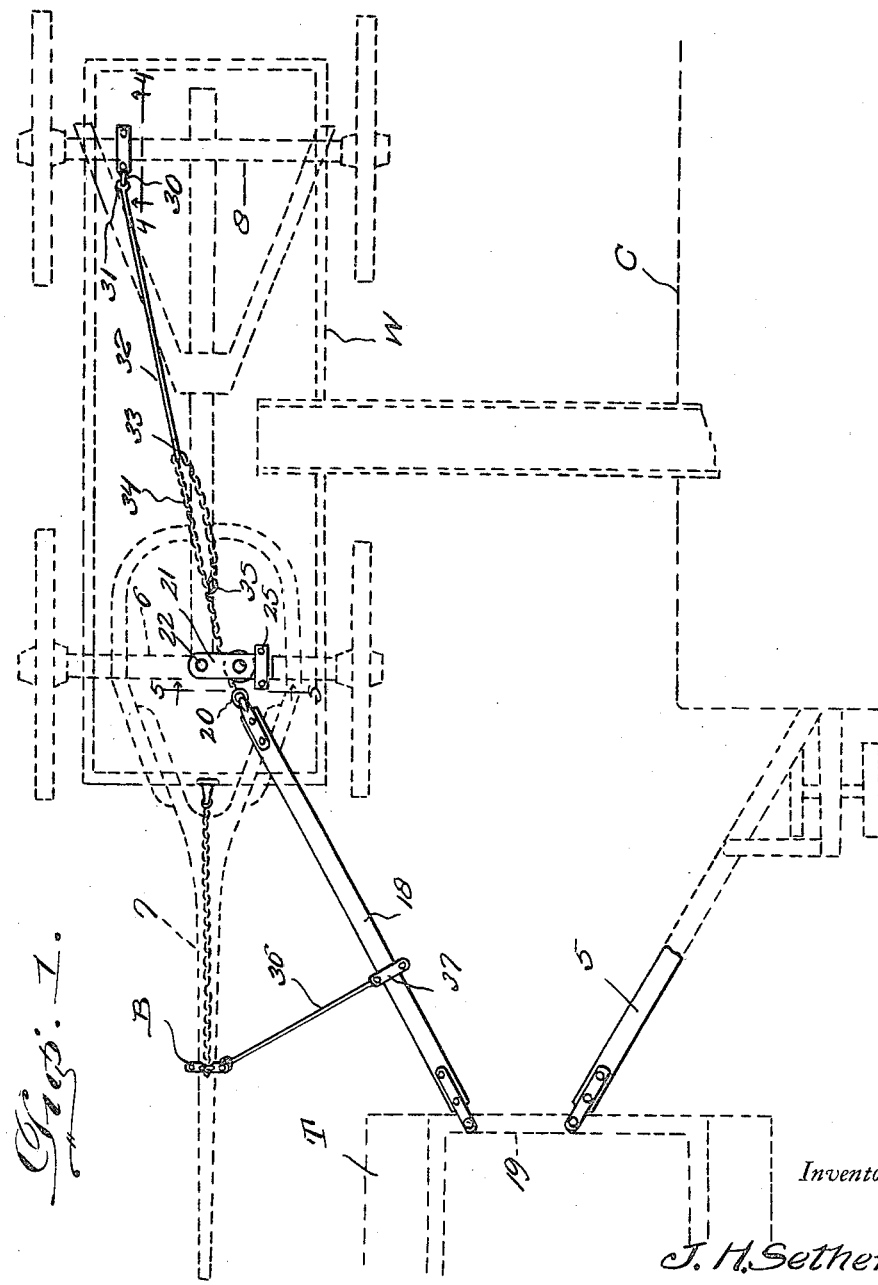
Inventor  
J. H. Sether,  
By Clarence A. O'Brien  
Attorney

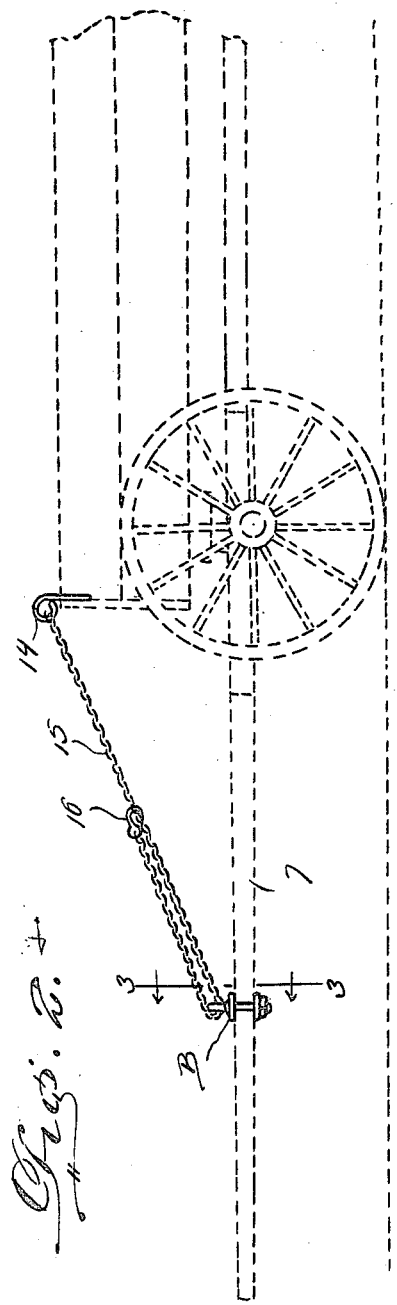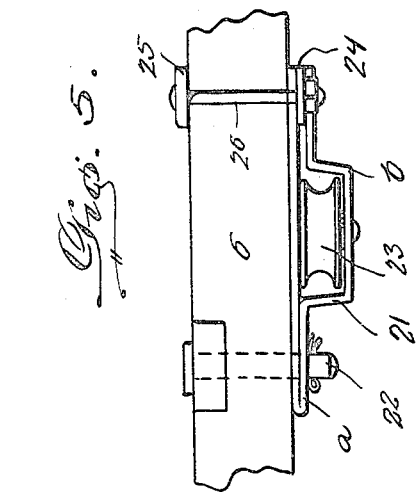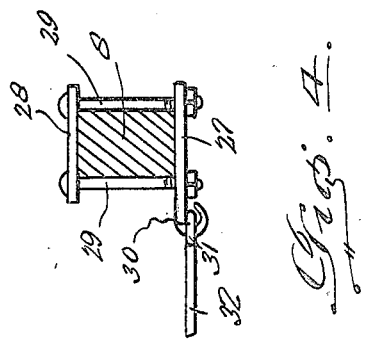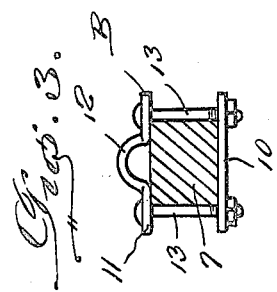

Patented Dec. 4, 1928.

1,693,673

UNITED STATES PATENT OFFICE.

JUST H. SETHER, OF JACKSON, MINNESOTA.

WAGON-TRACTOR HITCH.

Application filed December 17, 1927. Serial No. 240,871.

The invention relates to a wagon tractor hitch and has for its prime object to provide a structure for pulling a wagon behind a tractor to one side of a corn husking machine also pulled along by the tractor.

Another very important object of the invention resides in the provision of a structure of this nature which will eliminate side draft in the wagon.

A further important object of the invention resides in the provision of a wagon tractor hitch of this nature which is exceedingly simple in its construction, easy to mount on the wagon, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the apparatus embodying the features of my invention, Figure 2 is a side elevation of the tongue engaging bracket structure, Figure 3 is an enlarged detail section taken substantially on the line 3—3 of Figure 2, Figure 4 is an enlarged detail section taken substantially on the line 4—4 of Figure 1, and Figure 5 is an enlarged detail view taken substantially on the line 5—5 of Figure 1.

Referring to the drawing in detail it will be seen that the letter T denotes a tractor, the letter W a wagon, and the letter C a corn husking machine. The corn husking machine is pulled along by conventional means 5. The wagon W comprises among other usual elements a front axle 6, a tongue 7 projecting forwardly thereof, and a rear axle 8. The wagon W and the corn husking machine are pulled along behind the tractor T as is clearly indicated in Figure 1 and the purpose of the present invention is to eliminate side draft in the wagon and this is accomplished by the improved structure which will now be described in detail.

A tongue engaging bracket B is shown to advantage in Figure 3 and comprises a flat bottom plate 10, a top plate 11 having an intermediate portion thereof curved upwardly as at 12 and a pair of bolts 13. The plates 11 and 10 are clamped to the upper and lower surfaces respectively of the tongue 7 by means of the bolts 13 one of which is disposed to each side of the tongue. An eye bracket 14 is fixed to the wagon body at the top of the front thereof as clearly illustrated in Figure 2 and an adjustable chain 15 is engaged therewith and extended through the curved portion 12 of the bracket B and then hooked intermediate its ends as at 16 for holding the tongue 7 the desired height from the ground preferably in parallelism therewith. A straight draw bar 18 is engaged with the draw bar 19 of the tractor T and terminates at its rear end in an eye 20. A sheave supporting bracket 21 is formed from a single strip of metal bent intermediate its ends upon itself to provide an end portion $a$ of two laminations provided with an opening for receiving the king pin 22 and an intermediate portion of the lower arm of the bracket 21 is extended downwardly to form a seat $b$ in which is journaled a sheave 23. The ends of the bracket 21 are secured to a plate 24 which extends across under the axle 6. A plate 25 extends across the top of the axle 6 and bolt 26 connects plates 24 and 25. A plate 27 is mounted under the rear axle 8 being held in place by a plate 28 on top of the axle and bolts 29 engaged with plates 27 and 28. The plate 27 is formed with a hook or eye 30 at its forward edge for receiving an eye 31 of a draw bar 32 the forward end of which has an eye 33. A chain 34 is engaged with the eye 20 of the drawbar 18 and is trained over the sheave 23 and through the eye 33 and is then engaged with an intermediate portion of itself as at 35. A brace rod 36 is engaged by suitable means 37 with an intermediate portion of the bar 18 and is engaged with one of the bolts 13 of the bracket structure B and holds the bar 18 at a fixed angle in respect to the tongue 7. It is to be noted that the plate 37 is located adjacent the right hand end of the axle 8 while the bracket 21 is located adjacent the left hand end of the axle 6 that is extends toward said left hand end from the king pin 22. Therefore the pull on the draw bar 18 cooperating with the sheave 23 and the plate 27 will eliminate side draft with respect to the wagon W.

It is thought that the construction, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A hitch structure of the class described comprising a bracket including means whereby it may be attached to the rear axle of a wagon at one side thereof, a second bracket including means whereby it may be attached to the other side of the front axle of the wagon, a sheave in the second bracket, a draw rod engaged with the first bracket and projecting forwardly, a chain trained over the sheave and engaged with the draw bar, means for adjusting the length of the chain, a draw bar engaged with the chain and adapted to be engaged with the draw bar of a tractor, a brace rod engaged with the draw bar first mentioned and extending to the side thereof, and means for engaging the brace rod with an intermediate portion of the wagon tongue.

2. A hitch structure of the class described comprising a bracket including means whereby it may be attached to the rear axle of a wagon to one side thereof, a second bracket including means whereby it may be attached to the other side of the front axle of the wagon, a sheave in the second bracket, a draw rod engaged with the first bracket and projecting forwardly, a chain trained over the sheave and engaged with the draw bar, means for adjusting the length of the chain, a draw bar engaged wit the chain and adapted to be engaged with the draw bar of a tractor, a brace rod engaged with the draw bar first mentioned and extending to the side thereof, means for engaging the brace rod with an intermediate portion of the wagon tongue, and a chain engaged with the last mentioned means and with the wagon body to hold the tongue in an elevated position.

In testimony whereof I affix my signature.

JUST H. SETHER.